March 4, 1924.
E. STINER
PISTON RING
Filed Nov. 22, 1922
1,485,439
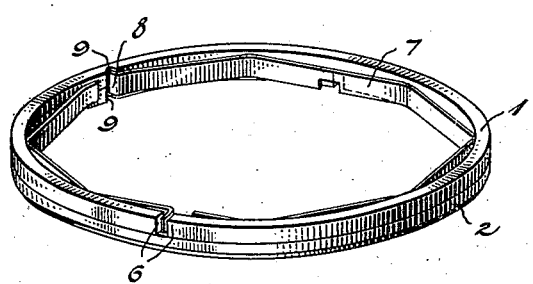
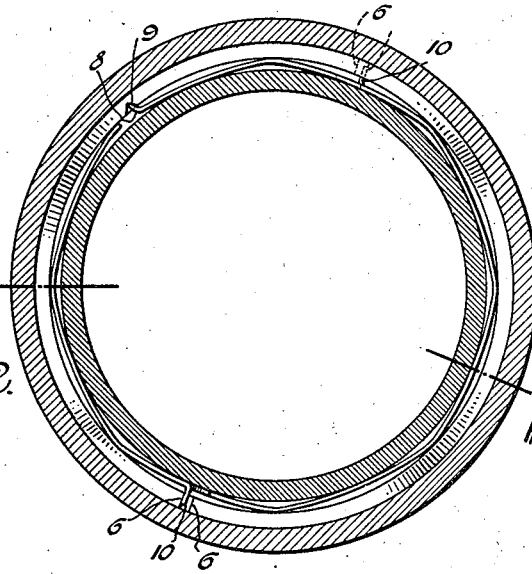
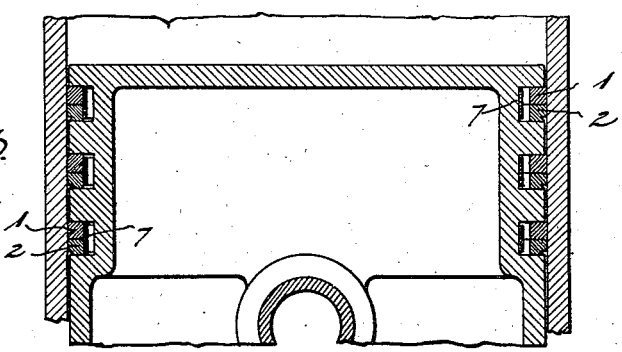
Inventor:
Earl Stiner
By
Attorneys Patented Mar. 4, 1924.

1,485,439

UNITED STATES PATENT OFFICE.

EARL STINER, OF DETROIT, MICHIGAN.

PISTON RING.

Application filed November 22, 1922. Serial No. 602,493.

*To all whom it may concern:*

Be it known that I, EARL STINER, a citizen of the United States of America, residing at Detroit, in the county of Wayne and State of Michigan, have invented certain new and useful Improvements in Piston Rings, of which the following is a specification, reference being had therein to the accompanying drawings.

This invention relates to piston rings for use in internal combustion engines, and has for its object the production of a device which will be gas tight and which will effectually prevent leakage of oil past the rings into the cylinder.

Each ring consists of two cast iron members of less hardness than the metal of the cylinder, so that in use, the rings will wear to fit irregularities of the cylinder. To hold the rings closely into contact with the surface of the cylinder, I provide a flat spring which when free from constraint, consists of a series of substantially straight sections connected by short bent portions. When placed in position, the spring lies between the bottom of the groove in the piston and the inside of the ring members, the middle of each spring section between the bent portions bearing against the bottom of the groove in the piston.

Since there is a limited space between the ring members and the bottom of the groove, each originally straight section of the spring is forced to curve around the curved surface of the bottom of the groove in the piston with the ends of each spring section bearing outward in contact with the inside of the ring sections at a plurality of spaced points. This provides a resilient pressure at a series of points within each piston ring, so that the configuration of the outer wearing surface of the rings is not determined solely by the forces ordinarily operating in an annular elastic body, but is effected by the additional spring pressure distributed at a series of points about the inner circumference.

When piston rings are to be supplied as a repair to commercial pistons of standard construction, their structure must be adapted to existing conditions. The depth of the grooves in the standard pistons places a limit upon the thickness of metal in the piston rings, and the available space between the rings and the bottom of the groove in the piston limits the possible configuration of the springs. The thickness of the spring is limited on one hand by the pressure it will exert when deflected to a certain degree with a limited amount of movement, and on the other hand the thickness is limited by the heat conditions existing in an internal combustion engine. If the spring is made too thick, there will be a rapid loss of temper. If the spring is bent into too many sections, or is made too thick, the pressure exerted will be so great that the piston will bind or the rings will wear too rapidly.

In practice, it has been found that a steel spring about twenty-two thousands of an inch in thickness, bent at substantially equal distances to contact with the interior of the ring sections at intervals of about 45° will produce highly satisfactory results. If bent to form a greater number of sections, the pressure becomes too great for practical use, while a smaller number does not provide enough pressure on the ring to hold it properly in contact with the cylinder.

In the drawings,

Figure 1 is a perspective view showing two ring members assembled with the spring inside as they appear before being placed on the piston;

Fig. 2 is a transverse section through a piston and cylinder;

Fig. 3 is a longitudinal section at right angles to that of Fig. 2, taken substantially on the line III—III of Fig. 2, and Fig. 4 is an enlarged sectional view showing the relation of the ring sections to the piston groove and to the wall of the cylinder.

Each piston ring consists of two members 1 and 2, of which the member 1 which is placed on the side toward the gas chamber is rectangular in section, and the member 2 is provided on the corner adjacent to the cylinder wall, remote from the gas chamber, with an oil groove. This oil groove is formed with a wall 3 substantially at right angles to the wall of the piston to form a sharp scraping edge lying closely in contact with the cylinder to prevent the passage of oil. The other wall 4 of the oil groove lies at an acute angle to the wall 3 and to the wall 5 of the ring groove, thus providing a sharp edge for the portion of the ring member in contact with the side wall of the ring groove to prevent oil from passing between the ring section and the piston.

The clearance between the side faces of the ring members 1 and 2 and the side faces of the ring groove in the piston may be made very small, since it has been found in practice that there is substantially no tendency for the ring members to bind with the groove, even when the piston becomes heated, the co-efficient of expansion of the piston being greater than that of the soft cast iron used in the ring.

The ring sections are formed with square cut ends 6, and when the ring sections are assembled, the points of separation are set opposite each other as indicated in Fig. 2.

Lying between the inner periphery of the ring sections and the bottom of the ring groove, is a spring 7 consisting of a flat strip of spring steel bent at intervals to contact with the interior of the ring sections at angular distances of about 45° around their inner perimeter. One end of the spring is bent outwardly as indicated at 8 to engage within notches 9 formed upon the interior wall of the ring sections, this engagement of the end 8 within the notches 9 acting to prevent relative angular movement of the two ring members. Without the use of these notches engaged by the end of the spring, the movement of the piston will result in relative movement of the two ring members until the points of separation between the ends 6 come into line, whereupon the pressure of the gas will act to maintain the gaps in line so that gas will escape from the combustion chamber on one stroke, and oil will be pumped into the cylinder on the other stroke.

As an additional means for preventing relative creeping movement of the ring members, the spring 7 may have lugs 10 struck out sidewise to lie between the ends 6 of the ring members. It will be understood of course that the space between the ends 6 may readily be made sufficient in extent to accommodate the lugs 10 while permitting the proper compression of the members within the cylinder, and it will also be understood that when the lugs 10 are used, the notches 9 and the bent end 8 need not be used. Similarly, it will be obvious that the lugs 10 may be omitted when desired, since the bent end 8 engaged within the notches 9 will ordinarily be sufficient to prevent any possible relative angular movement of the two ring members.

Piston rings constructed as herein described have been tested with many makes of automobile engines, and it has been found that the pressure of the ring sections against the cylinder wall may be made very much less than is customary with rings of the ordinary type in which experimental rings are not used. This reduction of pressure of course decreases the amount of friction upon the cylinder wall, resulting in easier running of the engine, while even with the light pressure employed, the pumping of oil is effectually prevented. While I am aware that springs have frequently been used with piston rings, I believe that those previously employed do not embody the principle herein disclosed, and I do not therefore wish to be limited to the exact details shown, except as may be necessitated by the terms of the claim when broadly construed.

I claim:—

A piston ring comprising a pair of split members provided on their inner periphery with notches at points such that when the notches are in registration, the split ends of the rings are out of registration, and a flat spring bent at substantially equal intervals adapted to lie in contact with the inner periphery of said ring members, said spring having one of its ends bent outwardly to engage within the registering notches in said ring members.

In testimony whereof I affix my signature in presence of two witnesses.

EARL STINER.

Witnesses:
 ARTHUR MINNICK,
 EMMA DECLERCQ.